June 10, 1952  P. C. PALMER  2,600,259
FISHING ROD
Filed Jan. 15, 1949  3 Sheets-Sheet 3

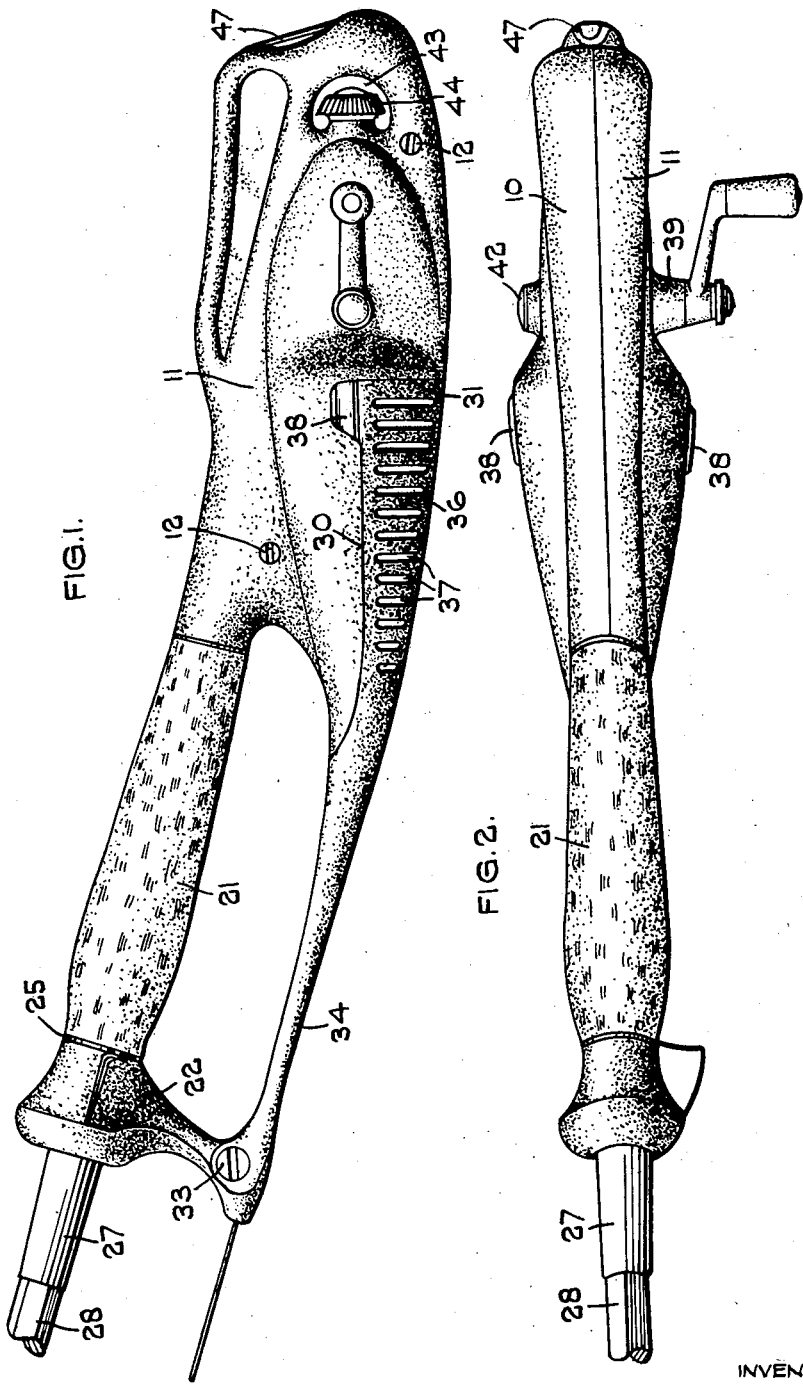

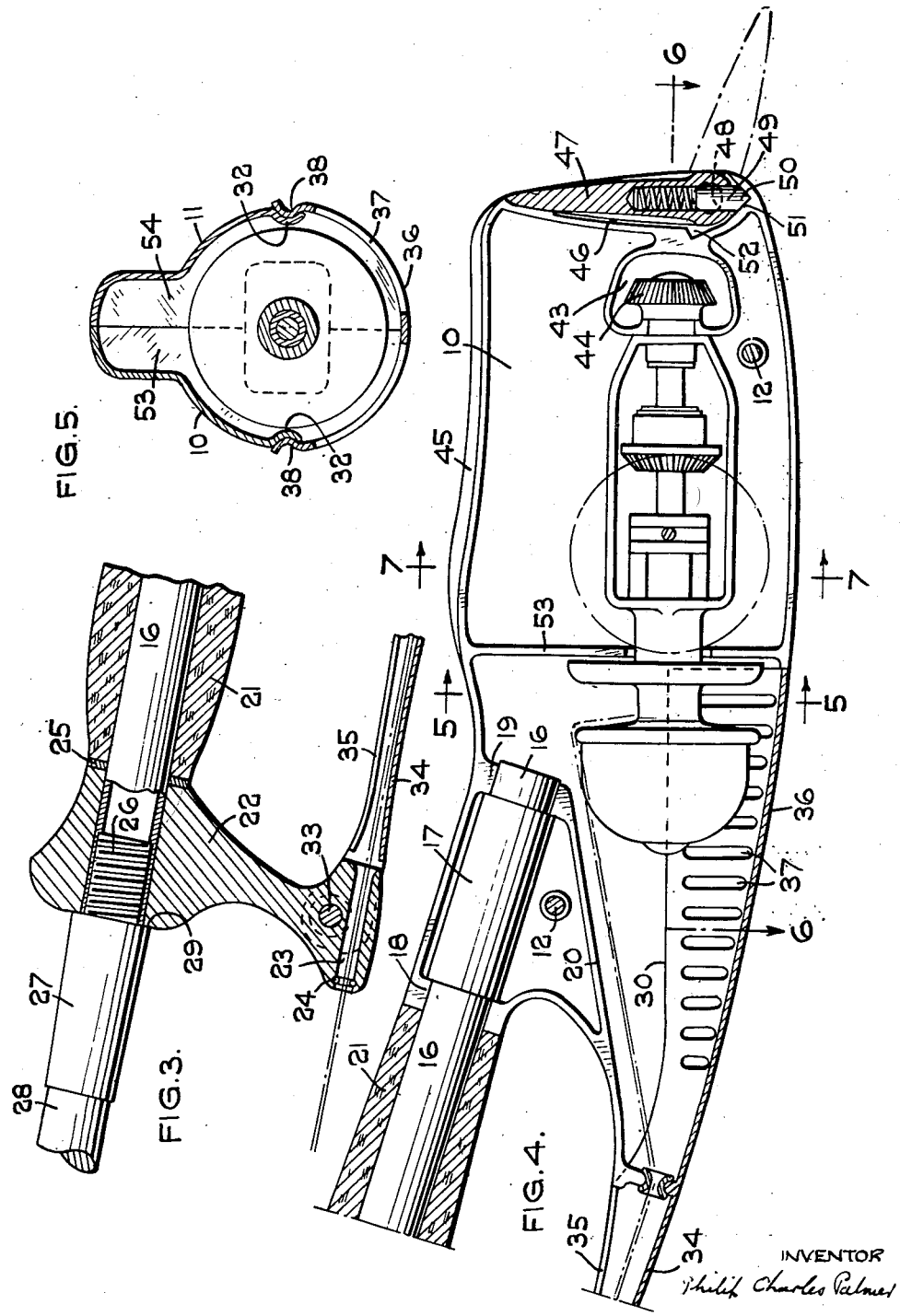

INVENTOR
Philip Charles Palmer

BY Richardson and David
Attys

Patented June 10, 1952

2,600,259

UNITED STATES PATENT OFFICE 2,600,259

FISHING ROD

Philip Charles Palmer, Alvechurch, England

Application January 15, 1949, Serial No. 71,181
In Great Britain January 21, 1948

1 Claim. (Cl. 43—20)

The usual practice in connection with fishing rods is to provide the rear end of the rod with a reel for the line, the reel being provided with a stem projecting transversely from the handle end of the rod, and the reel having its axis arranged either transversely to the length of the rod or parallel thereto.

Also according to the present invention I provide a combined handle and reel housing comprising a handle tube or rod adapted to be connected at its forward end to the rear end of the fishing rod, and at its rear end to a housing disposed to the rear of the handle tube or rod, and having a hollow portion disposed behind and below the handle tube or rod, said hollow portion being adapted to contain the reel.

According to the present invention I provide a combined handle and reel housing comprising a handle tube or rod adapted to be connected at its forward end to the rear end of the fishing rod, and at its rear end to a housing disposed to the rear of the handle tube or rod, and having a hollow portion disposed behind and below the handle tube or rod, said hollow portion being adapted to contain the reel, and a downwardly-projecting arm secured on the forward part of the handle tube or rod. The downwardly-projecting arm on the forward part of the handle tube or rod may have its lower end connected to the reel housing by a tubular stem forming a line guard which keeps the line away from the fisherman's fingers when gripping the handle and prevents the line from sagging, this stem being approximately parallel to the handle and spaced below it. The tubular stem forming the line guard may be pivotally connected at its forward end to the arm and at its rear end it may be detachably secured to the reel housing portion, so that it can be moved pivotally about a horizontal axis at its forward end so that the fisherman can obtain access to the interior of the reel housing, the rear end of the stem forming a movable cover for an opening therein.

The reel-operating spindle may project through a boss formed on the side wall of the reel housing at one side. If a device is provided for adjusting the pressure of the usual brake or check device such device may be operable by means of a stud mounted in a boss at one side of the reel housing.

The upper side of that portion of the reel housing which is situated to the rear of the rear end of the housing tube or rod may be formed to engage the underside of the fisherman's arm. It may for instance be formed as a longitudinal channel of concave form on the upper side.

The reel housing portion of the combined handle and reel housing may comprise a pair of mouldings or castings secured together to form a hollow body for containing a reel, and the handle rod or tube may have its rear end clamped between these two mouldings or castings, and a tubular handle may be mounted on the handle tube or rod, the forward end of the handle tube or rod having means for engaging and supporting the rear end of the fishing rod.

An arm may be fixed on the forward part of the handle tube or rod, this arm projecting downwardly and having its lower end formed as or provided with a line guide.

The invention is illustrated in the accompanying drawings, wherein one construction is shown in Figures 1 to 8.

Figure 1 is a view in side elevation.

Figure 2 is a plan thereof.

Figure 3 is a sectional view in side elevation showing the arm at the forward end of the handle tube.

Figure 4 is a sectional view in side elevation showing the reel housing and the rear end of the handle tube.

Figure 5 is a section on the line 5—5 of Figure 4.

Figure 6:
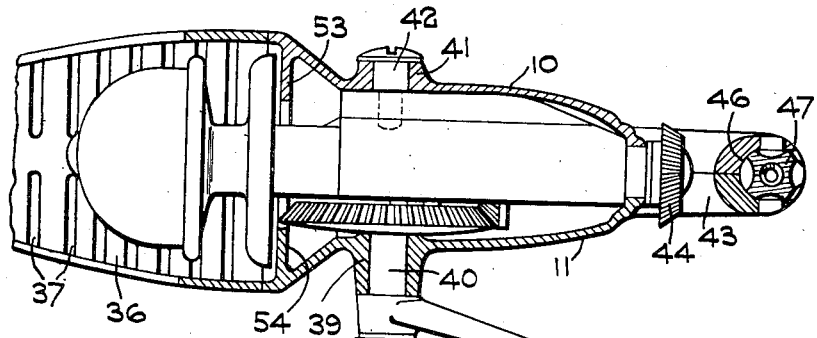
Figure 6 is a section on the line 6—6 of Figure 4.
Figure 7:
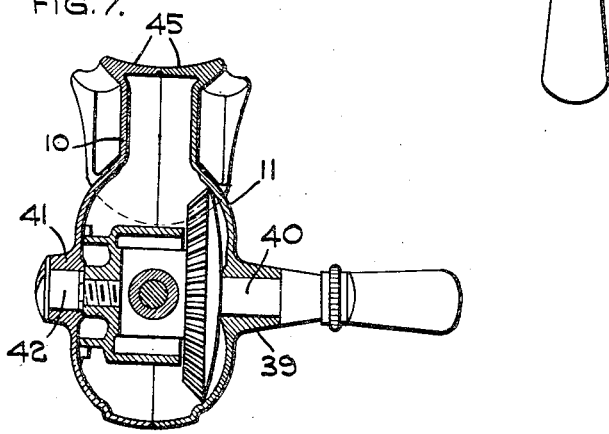
Figure 7 is a section on the line 7—7 of Figure 4.
Figure 8:
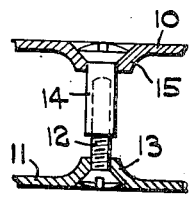
Figure 8 is a fragmentary sectional view showing the means employed to secure together the two mouldings or castings forming the reel housing.

In the construction shown in Figures 1 to 8 the combined handle and reel housing comprises a pair of mouldings or castings 10, 11. Each is of hollow form, and they are placed together edge to edge and secured by screws 12 the heads of which engage bosses 13, and the shanks of which engage in headed sleeve nuts 14. The heads of the sleeve nuts engage inwardly-projecting bosses 15 on the one element, while the heads of the screws 12 engage the bosses 13 on the other element.

These two mouldings or castings are attached to a handle tube 16, which forms a stem. The handle tube 16 is a metal tube and has secured to its exterior a sleeve 17. The two mouldings 10 and 11 are provided each with two half circular seatings 18 and 19 which grip the tube adjacent the two ends of the sleeve 17, and the half seatings 19 are connected by webs 20 to the forward ends of the mouldings or castings.

The handle tube 16 extends forwardly, and mounted on it is a tubular handle 21 of cork or other suitable material. The handle tube 16 projects from the forward end of the handle 21, and mounted on it is an arm 22 which projects downwardly and is provided with an opening 23 at its lower end which forms a line guide. The part 23 may be fitted with a bearing ring 24.

Mounted on the handle tube 16 between the forward end of the handle 21 and the rearward end of the arm 22 is a washer 25.

Screwing into the forward end of the handle tube 16 is the screwed shank 26 of a socket 27 in which the fishing rod 28 is fixed. The rear end of the socket 27 forms a shoulder 29 engaging the forward end of the arm 22.

The forward part of the lower side of the reel housings 10 and 11 is formed with an opening, the upper edge of which is shown at 30 and the rear edge of which is shown at 31. The edges 30 of the two mouldings or castings 10, 11 are formed to channel section, as shown at 32 in Figure 5.

Pivotally mounted at 33 on the arm 22 is a line guard 34. The forward part of this line guard may be of incomplete circular section, there being a longitudinal slot 35 at the top. The rear end portion 36 of this line guard is of approximately semi-circular section (see Figure 5) and is provided with a number of drainage slots 37. The upper edges of this rear portion 36 are formed as channels 38 which can be sprung into the channels 32 to cause the line guard to retain the position shown in Figure 1. By the exercise of a little force however the line guard may be pivoted downwardly on the pivot 33, thus opening the lower forward part of the reel housing. These channel-section parts 32, 38 are, as shown in Figure 1, confined to the rear end of the line guard and the adjacent parts of the mouldings 10 and 11. The edges 30 of the opening in the reel housing may be of flat form and abut the upper edges of the line guard in advance of the channel-section portions.

The line guard prevents any sagging of the line near the handle.

The moulding or casting 11 is provided with an external boss 39 for the winding spindle 40, and opposite to this boss on the casting or moulding 10 is a further external boss 41 for receiving a screw 42 which secures the winding mechanism to the moulding 10.

Near the rearward end both mouldings or castings 11 are provided with openings 43 in which is situated a knurled head 44 enabling the winding mechanism to be held or actuated by hand.

The upper surfaces 45 of the mouldings or castings 10 and 11 at their rear ends are formed to shallow concave channel section, and they are also concave longitudinally, the arrangement being such that these surfaces may engage the underside of the fisherman's arm when he is grasping the handle 21.

The rear ends of the mouldings or castings 10 and 11 may be formed with cavities 46, which together accommodate a pivoted spike 47 pivoted at 48 and adapted to be moved into the position shown in chain-dot lines in Figure 4. This spike at the pivoted end may have a spring-pressed plunger 49, having a pointed or chisel-shaped end 50 for engaging a seating 51 of corresponding shape, or the seating 52, so that the spike will retain either the position shown in full lines in Figure 4 or the position shown in chain-dot lines in Figure 4. The pivots of the spike may be formed as laterally-projecting trunnions, one engaging in each of the castings or mouldings 10 and 11. The spike is for the purpose of supporting the rod in an erect position by pushing the spike when in its projected position into the ground.

The moulding or casting 10 is provided with an internal stiffening web 53, and the moulding or casting 11 is provided with an internal stiffening web 54.

The hand grip 21 is disposed between the butt end of the rod 28 and the hollow reel housing, so that in grasping the handle 21 the weight of the reel housing and reel has a counterbalancing effect opposing the weight of the rod, which results in improved manoeuvrability of the rod in casting. Moreover, the rod can be advantageously braced during use by engaging the forearm behind the hand grasping the hand grip, with the upper part of the reel housing to the rear of said hand grip.

What I claim then is:

In a fishing rod, a combined handle and reel housing comprising a rigid stem, a hand grip on said stem, the stem projecting from both ends of the hand grip, a pair of mouldings which together form a hollow housing for a reel, said mouldings at their forward ends embracing the rearwardly-projecting end of the stem, the reel housing extending wholly to the rear of said hand grip, an arm extending laterally from the forwardly projecting end of the stem and having a line guide hole for maintaining a fishing line spaced away from the hand grip, a line guard adapted to enclose a fish line intermediate the reel housing and said arm alongside the hand grip, pivoted forwardly to the free end portion of the arm and detachably connected rearwardly to said reel housing, and a socket at the forward end of said stem for receiving the butt end of a rod, said hand grip being disposed wholly between said reel housing and the socket, said reel housing having a concave portion in its upper surface engageable by the forearm behind a hand grasping the hand grip.

PHILIP CHARLES PALMER.

REFERENCES CITED

The following references are of record in the file of this patent:

UNITED STATES PATENTS

| Number | Name | Date |
|--------|------|------|
| 415,322 | Follett | Nov. 19, 1889 |
| 479,440 | Martin | July 26, 1892 |
| 1,041,376 | Toepfer | Oct. 15, 1912 |
| 1,256,389 | Strang | Feb. 12, 1918 |
| 1,319,268 | Caldwell | Oct. 21, 1919 |
| 1,328,696 | Smith | Jan. 20, 1920 |
| 1,572,104 | Budd | Feb. 9, 1926 |
| 1,632,522 | Thayer | June 14, 1927 |
| 2,027,853 | Benander | Jan. 14, 1936 |
| 2,206,019 | Benson | July 2, 1940 |
| 2,299,156 | Lind | Oct. 20, 1942 |
| 2,342,993 | Wright | Feb. 29, 1944 |